United States Patent [19]

Perneczky

[11] Patent Number: 4,633,999
[45] Date of Patent: Jan. 6, 1987

[54] SELF-ADJUSTING CONVEYOR BELT CLEANING APPARATUS

[76] Inventor: George C. Perneczky, 8918 Biloba, Orland Park, Ill. 60462

[21] Appl. No.: 771,836

[22] Filed: Aug. 30, 1985

[51] Int. Cl.⁴ .............................................. B65G 45/00
[52] U.S. Cl. .................... 198/499; 15/256.5
[58] Field of Search .............. 198/497, 499; 15/256.5, 15/256.51, 256.6

[56] References Cited

U.S. PATENT DOCUMENTS

| | | | |
|---|---|---|---|
| 3,674,131 | 7/1972 | Matson | 198/499 |
| 3,994,388 | 11/1976 | Reiter | 198/499 |
| 4,249,650 | 2/1981 | Stahura | 198/499 |
| 4,359,150 | 11/1982 | Bowman et al. | 198/497 |
| 4,533,036 | 8/1985 | Gordon | 198/499 |
| 4,533,037 | 8/1985 | Kerr | 198/499 |

Primary Examiner—Joseph E. Valenza
Assistant Examiner—Michael Stone
Attorney, Agent, or Firm—Kirkland & Ellis

[57] ABSTRACT

The present invention relates to a self-adjusting apparatus for use in cleaning the surface of endless belt conveyor belt apparatuses and the like. The apparatus is characterized by a blade tip which is positioned to contact the surface of the conveyor belt at a location where the conveyor belt is in contact with a head pulley, snub pulley, idler roller, or the like. The blade tip is attached to a rotatable and translatable support structure. The support structure comprises a plurality of tortion units which permit the blade tip to move in response to deformations of the surface of the conveyor belt during the operation of the conveyor belt.

11 Claims, 17 Drawing Figures

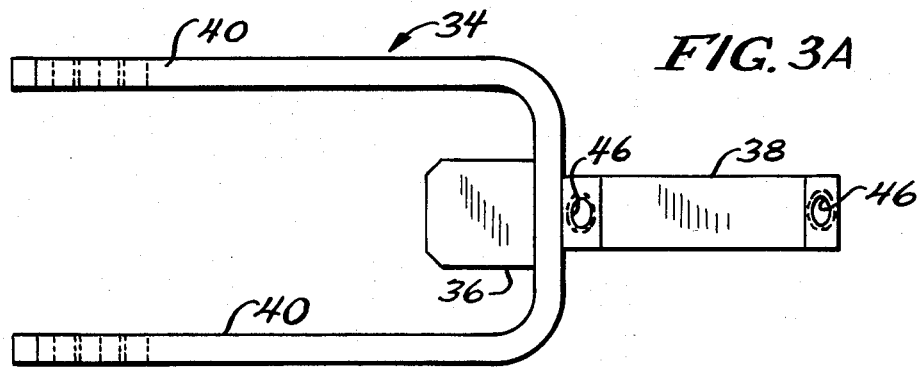
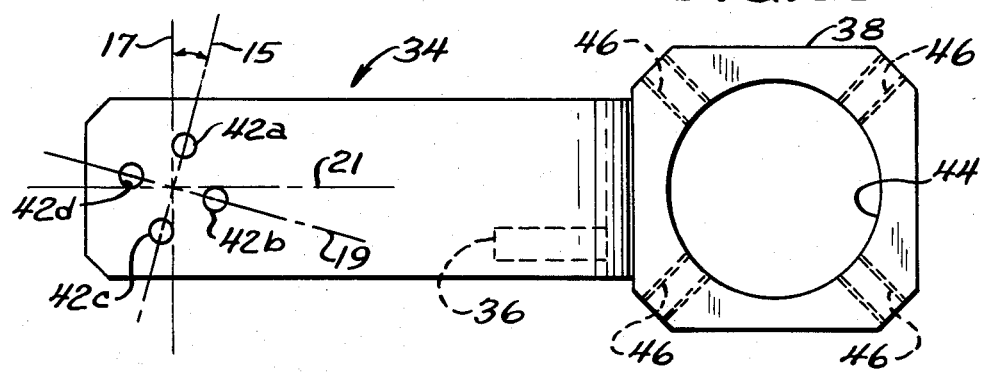
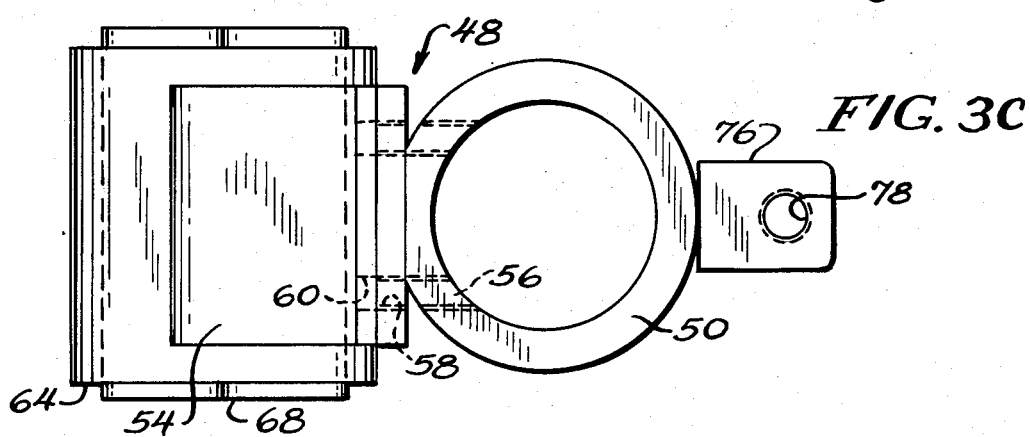
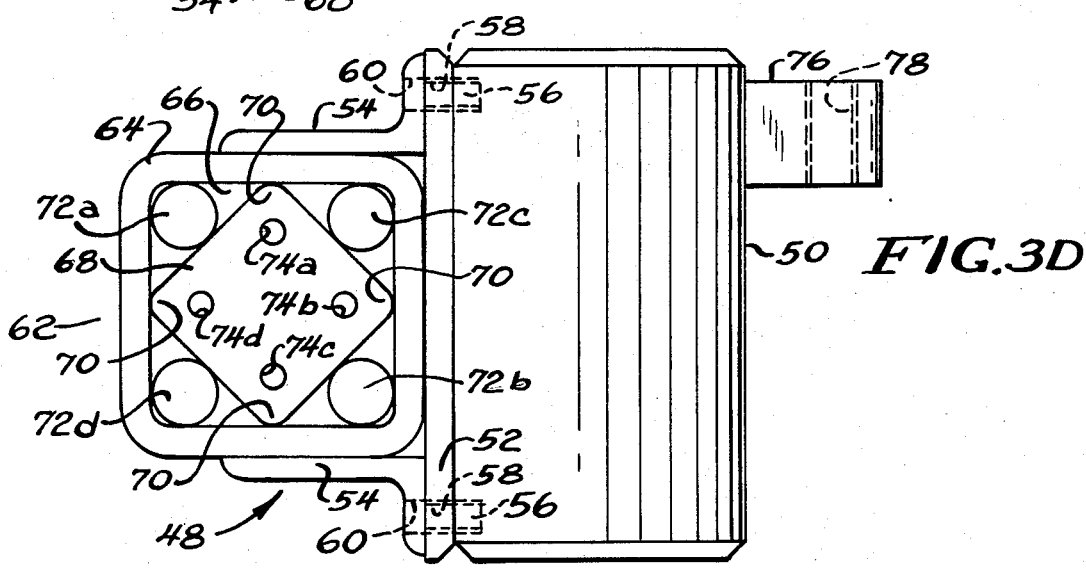

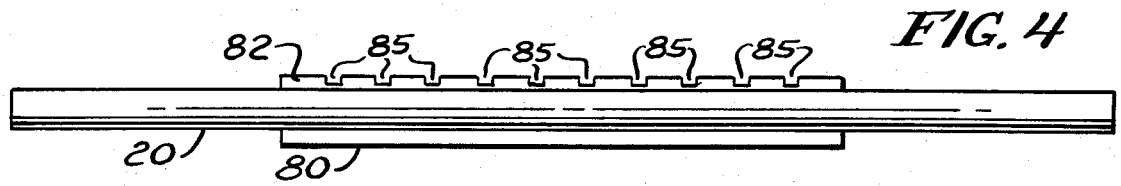
FIG. 4
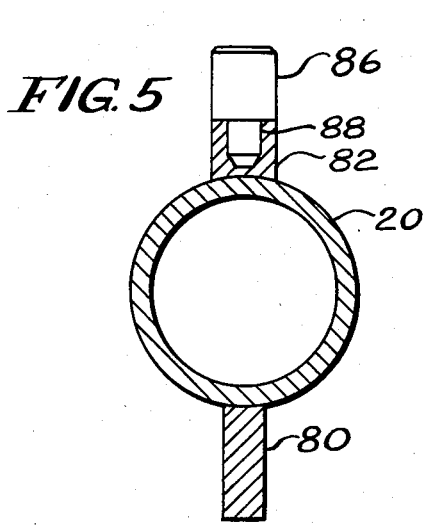
FIG. 5
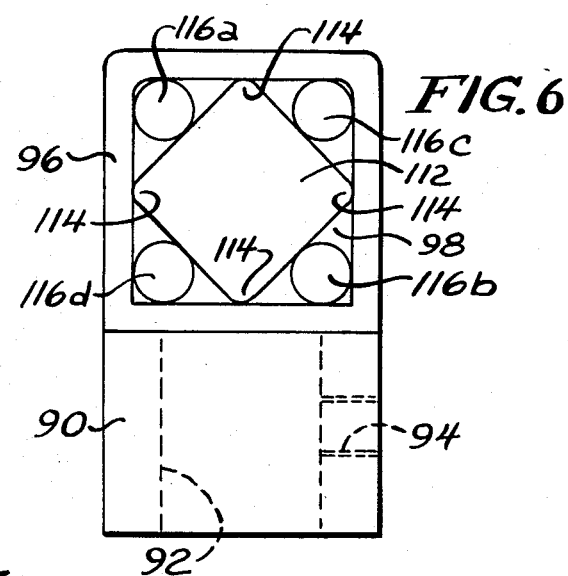
FIG. 6
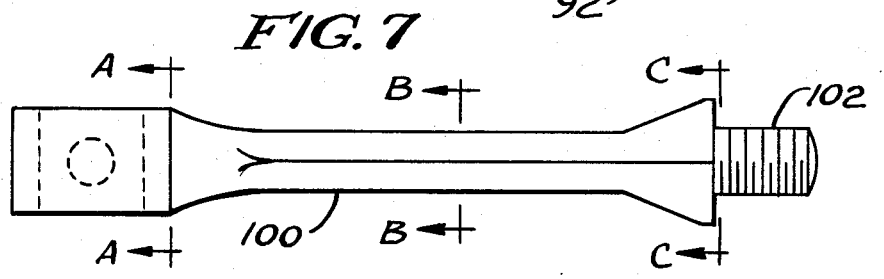
FIG. 7
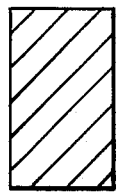
FIG. 7A
FIG. 7B
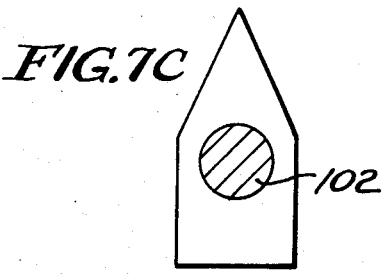
FIG. 7C
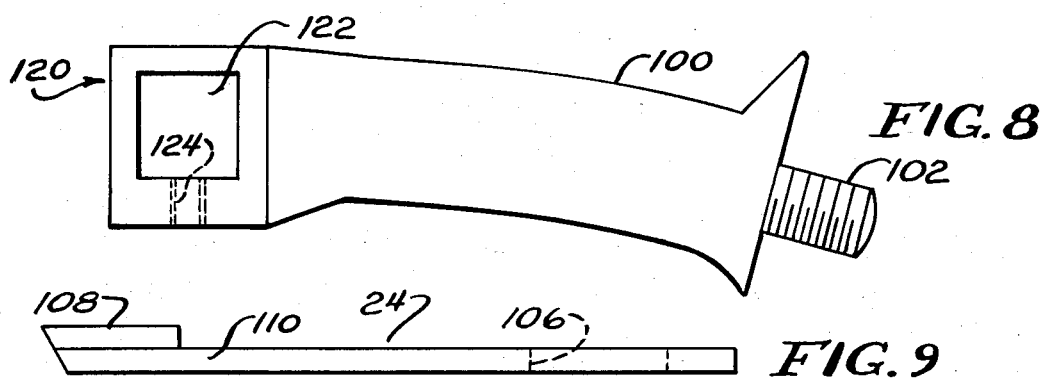
FIG. 8
FIG. 9

SELF-ADJUSTING CONVEYOR BELT CLEANING APPARATUS

BACKGROUND OF THE INVENTION

1. Field of the Invention

The present invention generally relates to a self-adjusting apparatus for use in cleaning surfaces of endless belt conveyor belt apparatuses, and the like.

2. Description of the Prior Art

When bulk material such as coal, coke, sinter, stone, ore, and the like are transported on endless belt conveyor belts, oftentimes some of the materials do not drop off the discharge end of the conveyor belt. Such materials, which may be of a moist or putty-like consistency, stick to the conveyor belt, with a substantial portion of the materials shaking off the belt as the belt returns to the tail-end section of the conveyor apparatus. The materials so shaken off may build up on the floor below the conveyor belt apparatus, to such an extent that the materials may surround components of the apparatus, such as for example the return and training idlers of the conveyor belt, thereby detraining the belt and damaging the components of the conveyor apparatus. Such build-up of materials around the conveyor belt apparatus requires clean-up of the area, replacement of damaged return and training idlers, belts, end pulleys, snub pulleys, and other components of the conveyor belt.

Many different types of conveyor belt cleaning devices have been used in the past in an attempt to deal with the material carried back from the discharge end of the conveyor belt. For example, brushes have been positioned past the discharge end point and in contact with the conveyor belt to brush material from the belt. However, the material has the tendency to build up and compact and cake between the bristles of the brushes thereby rendering the brushing action ineffective.

Streams of compressed air have also been used to clean conveyor belts. However, the cost of generating such compressed air is quite high and the use of compressed air frequently creates turbulence which results in a dusty environment around the conveyor belt apparatus.

Likewise, single scrapers or scrapers with multiple hard blades have been used in an attempt to clean conveyor belts. Generally, these scrapers are mounted behind the head pulley; however, hard scrapers currently in use in the industry often damage or destroy the conveyor belt and do not clean properly the belt. Other scrapers utilized to clean conveyor belts include blades made from soft, flexible material, with the blades mounted on the head pulley. Such scrapers are quite inefficient and frequently result in damage to the conveyor belt when grit and other small particles lodge between the flexible scraper and the conveyor belt thereby causing a "sandpaper" effect when the conveyor belt is operated.

As is well known in the art, when the conveyor belt leaves the discharge end pulley, it begins to change shape from a straight-line cross section to a concave cross section having intermittent wave action. This occurs until the conveyor belt reaches the snub pulley or the first return idler, at which point the belt, because it is supported on the snub pulley or the first return idler, again achieves a straight-line cross section. Thus, when the conveyor belt is not supported, a cross section of the belt would take a concave shape having an intermittent wave action.

Even though it has been recognized that the unsupported conveyor belt takes a concaved shape, most conveyor belt cleaning devices in the prior art are installed behind the head pulley in the area where the belt is unsupported. These devices, which have either single or multiple scraping blades having a straight-line cross section, are rigidly mounted or, in some instances, mounted by springs. Because of the concave shape of the conveyor belt at such locations, frequently the scraping blades do not fully contact the conveyor belt across its width. Rather, the ends of such blades make contact with the belt, while the center portion of the blades do not. In such instances, material adhering to the conveyor belt is not cleaned off in the area near the center of the cleaning blades; this has a further disadvantage because as the material travels through the void between the conveyor belt and the center portion of the cleaning blade, the center portion is worn faster than the ends thereof. This causes the ends of the blades to become sharpened by wear and cut grooves into the face of the belt. It is for this reason that cleaning blades utilized in such cleaning apparatus are replaced very frequently.

In a further effort to avoid the conveyor belt damage noted above, some prior art devices have cleaning blades constructed in an arcuate shape. Such devices assume that the curved blade will match the shape of the conveyor belt as the belt passes thereacross. However, because these devices are installed at a location where the conveyor belt is unsupported, the belt may not assume the exact curvature of the blade. Thus, cleaning devices having such blades have the disadvantage similar to that discussed above with respect to straight blades; that is, the edges of the curved blades, because they do not touch the belt, are worn excessively by the material being carried back by the conveyor belt. This results in the center portion of the blades becoming sharp and destroying the belt as described above, while the material sticking to the conveyor in the area underlying the edges of the blade remains on the belt and is not removed.

The prior art has also recognized that the better location for a cleaning apparatus is on the head pulley. At this position, the flexible conveyor belt is still wrapped on the pulley and is supported by that pulley. This results in a belt which is flat and does not have the concaved or wavey attributes associated with an unsupported belt. In addition, at this location a flat cleaning blade could make flush contact with the surface of the belt. As a further advantage, the cleaning blade at this location is directly above the main discharge end chute such that the material scraped off the conveyor belt would fall with the bulk material being unloaded.

However, prior art cleaning devices which are positioned at the location where the conveyor belt is wrapped and supported by the head pulley are comprised of a single or double flexible bar, such as rubber or urethane, supported by a continuous steel bar. This apparatus is pressed against the surface of the conveyor belt and is pivotably supported by levers mounted parallel to the conveyor belt. The flexible bar cleaning apparatus is forced into the face of the conveyor belt by means of counterweights or springs. Such devices provide several disadvantages. First, the flexible conveyor belt itself often exhibits unevenness due to uneven wear; that is, the center of the conveyor belt wears faster due to the fact that generally more material travels on the center of the belt than along the outer edges. Because of this, constant pressure of the cleaning bar cannot be achieved across the width of the conveyor belt so the cleaning efficiency is reduced. In addition, contaminants not detachable by the cleaning bar or a slight out of roundness of the head pulley will cause the cleaning bar to bounce from the surface of the belt thereby causing the cleaning bar to miss portions of the belt.

In order to counteract the above problems, prior art devices have increased the contact forces associated with the cleaning bar such that the cleaning bars are firmly held in contact with the conveyor belt. In order to do so, the cleaning bars must be made of a soft, flexible material because a hard material, such as, for example, steel or tungsten carbide, will damage the surface of the conveyor belt at increased contact pressures. It has been found, however, that when such soft, flexible materials are used as cleaning bars, small particles of the material removed from the surface of the conveyor belt will be imbedded in the face of such cleaning bars. This results in such cleaning bars acting with a sandpaper effect on the surface of the conveyor belt thereby damaging the belt.

The novel apparatus of the present invention overcomes the foregoing deficiencies noted in the prior art by providing an apparatus which cleans the surface of conveyor belts and removes therefrom material that is not discharged from the discharge end of the conveyor belt. The present invention accomplishes this result in a manner which minimizes damage to the surface of the conveyor belt. Accordingly, it is an object of the present invention to provide an apparatus for cleaning conveyor belts which does not have the inherent deficiencies of the prior art.

It is yet another object of the present invention to provide a cleaning apparatus which includes one or more blade tips positioned in contact with the surface of the conveyor belt at a location where the conveyor belt is in contact with the head, or other, pulleys of the conveyor belt system, thereby allowing material to be removed from the conveyor belt in an efficient manner.

It is yet a further object of the present invention to provide a cleaning apparatus which is self-adjusting in that the blade tips move in response to deformities of the head, or other, pulleys and the conveyor belt surface and in that the blade tips remain in contact with the belt surface as the tips wear during use.

These and other objects and avantages of the present invention will become apparent to those skilled in the art with reference to the foregoing, the attached drawings, and the description of the invention which hereinafter follows.

SUMMARY OF THE INVENTION

The present invention provides a self-adjusting cleaning apparatus for use in cleaning the surface of conveyor belts and the like. The apparatus comprises a blade support having a blade tip attached thereto; the blade support is attached to a curvilinear arm. The curvilinear arm is connected to a suspension unit holder which is mated with a plug removably engaged to a shaft. Each end of the shaft is rotatably and torsionally supported on an arm support which is threadably engaged on a threaded spindle. The spindle is attached to supports adapted to be connected to stationary structures associated with the conveyor belt. Adjustment of the cleaning apparatus may be made by rotating the shaft around its longitudinal axis and translating the arm support along the threaded spindle. The self-adjusting feature of the present invention results from the torsion action associated with both the curvilinear arm and the arm support.

BRIEF DESCRIPTION OF THE DRAWINGS

FIG. 3A is a top view of the U-shaped bracket associated with the arm support.

FIG. 3B is a side view of the U-shaped bracket shown in FIG. 3A.

FIG. 3C is a top view of the housing of the arm support.

FIG. 3D is a side view of the housing shown in FIG. 3C.

FIG. 4 depicts the shaft utilized in the present invention.

FIG. 5 is a cross-section of the shaft, shown in FIG. 4, depicting the reinforcing bar and a plug positioned within a void in a bar attached to the shaft.

FIG. 6 is a cross-section of the suspension unit which is engageable on the plug shown in FIG. 5.

FIG. 7 is a top view of the blade arm utilized in the present invention.

FIG. 7A is a cross-section of the blade arm taken along the lines A—A of FIG. 7.

FIG. 7B is a cross-section of the blade arm taken along the lines B—B of FIG. 7.

FIG. 7C is a cross-section of the blade arm taken along the lines C—C of FIG. 7.

FIG. 8 is a side view of the blade arm shown in FIG. 7.

FIG. 9 is a side view of the blade showing the blade tip connected thereto.

DESCRIPTION OF THE PREFERRED EMBODIMENT

Figure 1:
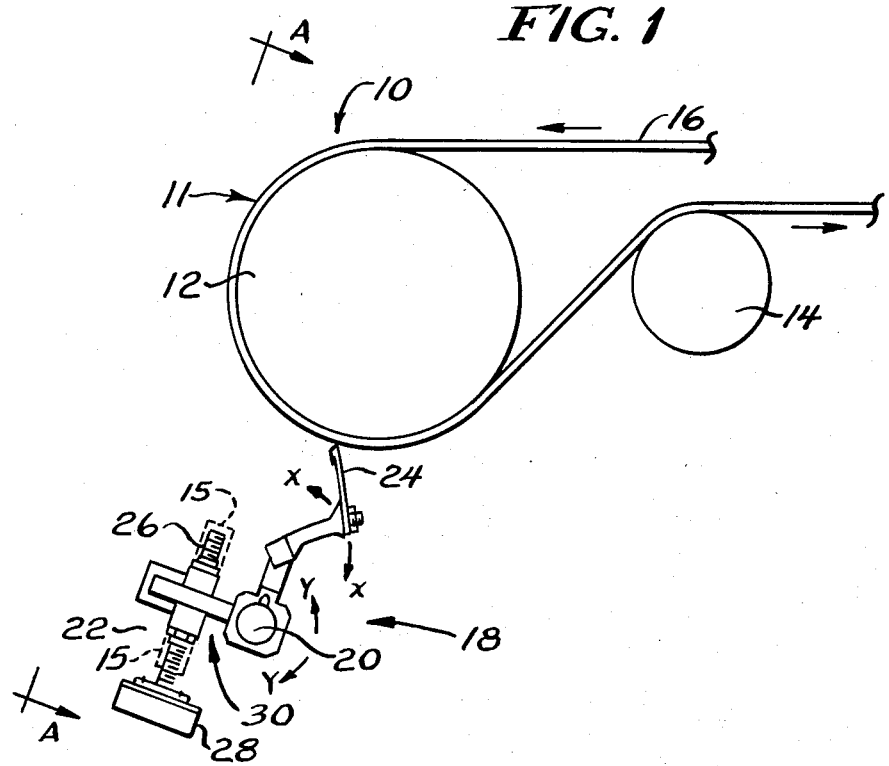
FIG. 1 is a partial cross-section of a portion of a conveyor belt apparatus showing the cleaning apparatus of the present invention associated therewith.

As noted, the present invention relates to a self-adjusting cleaning apparatus used to clean conveyor belts, and the like. With respect to conveyor belts, as depicted in FIG. 1, the conveyor belt apparatus (not a part of this invention) is generally shown by reference numeral 10. The conveyor belt apparatus 10 is comprised of a head pulley 12, a snub pulley 14, and an endless flexible belt 16. The flexible belt 16 travels in the direction of the arrows shown on FIG. 1 by virtue of rotation imparted on the head pulley 12 and the snub pulley 14 through motors (not shown) which are conventional in the conveyor belt art. Idler rollers and other components of the conveyor belt apparatus 10 are not shown in FIG. 1. Material carried on the belt 16 is discharged at the discharge end generally shown by reference numeral 11.

Figure 2:
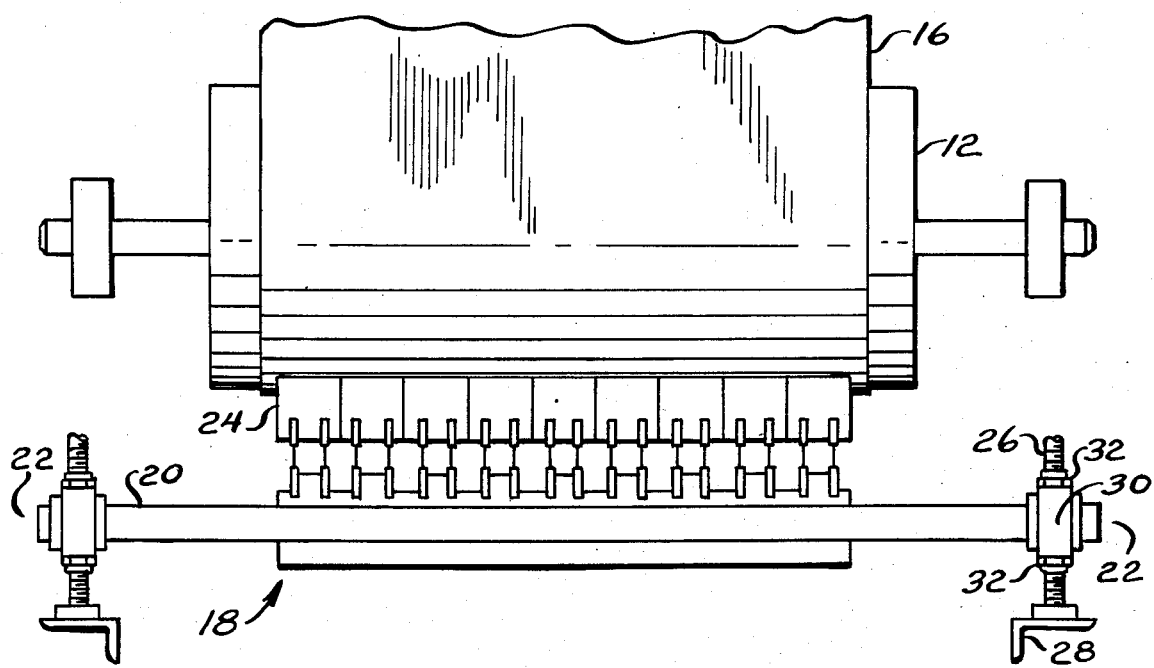
FIG. 2 is a view of FIG. 1 taken along the lines A—A showing the cleaning apparatus of the present invention.

The self-adjusting cleaning apparatus 18 of the present invention shown in FIG. 1 is also depicted in FIG. 2 (taken along the lines A—A of FIG. 1). As there shown, the cleaning apparatus 18 comprises a shaft 20 engageably attached at each end thereof to end units 22. A portion of the end units 22 may be enclosed with a rubber boot 15 (shown in dashed lines in FIG. 1) for protection from materials falling from the belt 16 during the cleaning operation. Also engageably attached to the shaft 20, by means hereinafter described, is at least one blade 24.

The end units 22 include a threaded spindle 26 with one end thereof attached to a spindle support 28. The spindle support 28 is adapted to be attached to a stationary structure such as a side wall of or an angle iron associated with the conveyor belt 10 so that the cleaning apparatus 18 can be held in position adjacent the flexible belt 16. An arm support 30 is positioned on the threaded spindle 26 and held thereon with threaded adjustment lugs 32 having sleeves 33 associated therewith (see FIG. 11). Thus, the arm support 30 is translatable along the longitudinal axis of the spindle 26 through the adjustment of the threaded adjustment lugs 32.

The arm support 30 is shown in detail in FIGS. 3A through 3D. As depicted in FIG. 3A, the arm support 30 comprises, as one component, a generally U-shaped bracket 34 having attached, as by welding, a stop 36 to the inner surface thereof along the closed portion of the U-shaped bracket 34. A shaft support 38 is attached to the outer surface of the U-shaped bracket 34. The arms 40 of the U-shaped bracket 34 are provided, at the ends thereof, with holes 42a, 42b 42c, and 42d. These holes, as shown in FIG. 3B (which is a side view of FIG. 3A) are off-set from the vertical and horizontal axes of the arms 40. That is, the center line of the holes 42a and 42c (shown by the dashed line at reference numeral 15) are off-set from the vertical axis of the arm 40 (shown by the dashed line at reference numeral 17) and the center line of the holes 42b and 42d (shown by the dashed line at reference numeral 19) are off-set from the horizontal axes of the arms 40 (shown by the dashed line at reference numeral 21). It has been determined that the angular off-set of these holes from the respective horizontal and vertical axes of the arms 40 can be from about 1° to about 20°, with about 15° being preferred.

As also shown in FIG. 3B, the shaft support 38 is provided with a void 44 for receipt of the shaft 20. In addition, the shaft support 38 includes at least one threaded hole 46 for the receipt of a set screw (not shown) which is used to hold the shaft 20 in position when the shaft 20 is inserted into the void 44 of the shaft support 38. Preferably, the shaft support 38 includes a plurality of threaded holes 46 to ensure that the shaft 20 is securely held within the shaft support 38.

The arm support 30 also includes, as another component, a housing 48 (see FIGS. 3C and 3D). The housing 48 comprises a generally tubular member 50 sized for receipt of the threaded spindle 26 therein. The tubular member 50 is attached to a plate 52 and L-shaped brackets 54 through bolts (not shown) inserted through holes 56, 58, and 60.

Positioned between the L-shaped brackets 54, and attached thereto as by welding, is a torsion unit 62. The torsion unit 62 advantageously may be of the type sold by Lovejoy, Inc., Unit No. DR-A, type 45×80. This unit 62 comprises a chamber 64 having a square-shaped central void 66 therein. A square-shaped member 68 having rounded corners 70 is positioned in the central void 66 and is adapted such that a diagonal dimension of the square-shaped member 68 is less than horizontal dimension of the central void 66. When positioned in the void 66, the diagonal axes of the square-shaped member 68 lie along the vertical and horizontal axes of the chamber 64. Also positioned within the void 66 are a plurality of torsion members 72, depicted in FIG. 3B as 72a, 72b, 72c, and 72d. These members are advantageously constructed from a hard rubber-like material having resiliency associated therewith. It should be appreciated that the torsion unit 62 acts in a combined spring-damper-bearing fashion due to the resiliency of the torsion members 72 when the square-shaped member 68 is rotated about its longitudinal axis. The square-shaped member 68 is also provided with a plurality of holes positioned along the diagonal axes thereof (shown as reference numerals 74a, 74b, 74c, and 74d) for purposes hereinafter described.

In order to form the arm support 30, the housing 48 is mated with the U-shaped bracket 34. This is done by aligning the holes 74a, 74b, 74c, and 74d, of the square-shaped member 68, with, respectively, the holes 42a, 42b, 42c, and 42d found in the arms 40 of the U-shaped bracket 34 and positioning set screws, bolts, and the like (not shown) therethrough. Upon such positioning, the tubular member 50 will be off-set from the vertical by an angle equivalent to that discussed above with respect to the holes 42a, 42b, 42c, and 42d. This is shown in FIG. 11.

Figure 11:
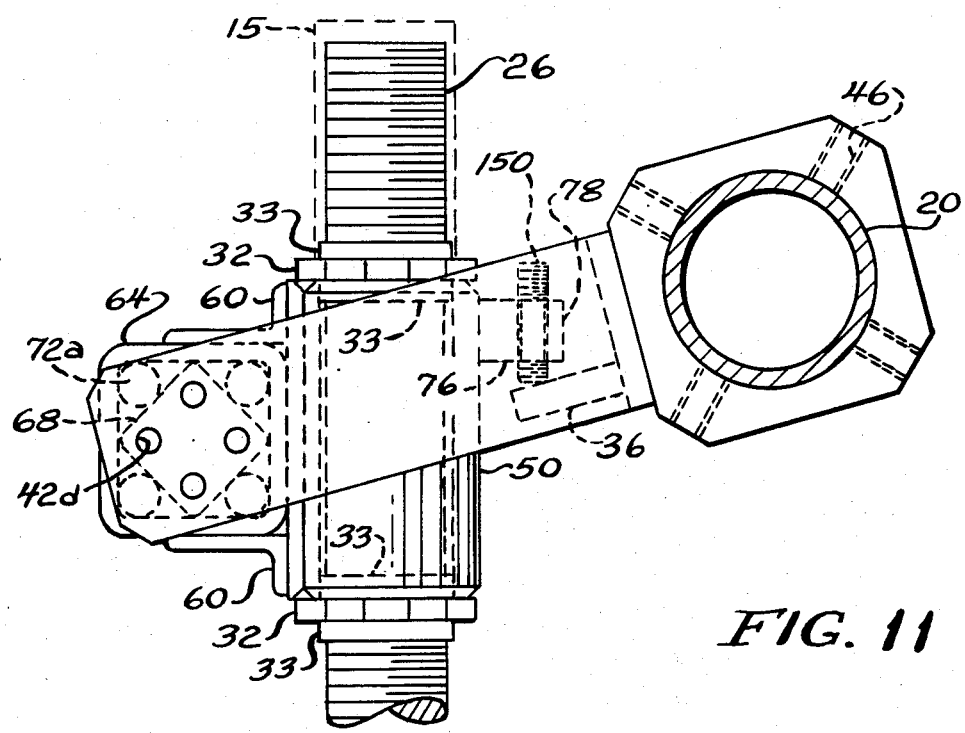
FIG. 11 shows the housing depicted in FIGS. 3C and 3D mated to the U-shaped bracket depicted in FIGS. 3A and 3B.

The tubular member 50 is also provided with a set screw holder 76, which includes a void 78 for receipt of a set screw 150 (see FIG. 11). The stop 36 of the U-shaped bracket 34 is advantageously positioned such that upon turning of the set screw in the void 78, the set screw 150 will contact the stop 36. As will be explained hereinafter, when the arm support 30 is secured to the shaft 20, turning the set screw 150 onto the stop 36 will cause the square-shaped member 68 to rotate about its longitudinal axis due to the resiliency associated with torsion members 72a, 72b, 72c, and 72d. Thus, when the arm support 30 is positioned on the spindle 26 and the adjustment lugs 32 are tightened to hold the arm support 30 firmly, turning the set screw 150 will cause the U-shaped bracket 34 to be rotated about the longitudinal axis of the square-shaped member 68.

Referring now to FIG. 4, the shaft 20 is shown. The shaft 20 includes a reinforcing bar 80 welded along one surface thereof to reinforce the shaft 20 and on the opposing surface thereof a square-shaped bar 82 is welded thereto (see FIG. 5). The shaft 20 may be a pipe to decrease the overall weight of the cleaning apparatus 18. The bar 82 is provided with a plurality of spaced-apart holes 85 for receipt of a plurality of spaced-apart plugs 86. The bottom portion 88 of the plugs 86 is sized to provide a tight fit in the holes 85.

Positioned on each plug 86 is a suspension unit holder 90 (see FIG. 6). The suspension unit holder 90 is provided with a void 92 adapted to receive the plug 86. Communicating with the void 92 is a threaded screw hole 94 for receipt of a set screw (not shown) to hold the suspension unit holder 90 tightly on the plug 86. The suspension unit holder 90 includes a top portion 96 thereof containing a square-shaped void 98 therein. A square-shaped bar 112 having rounded corners 114 is positioned in the void 98 and is adapted such that a diagonal dimension of the square-shaped bar 112 is less than horizontal dimension of the void 98. When positioned in the void 98, the diagonal axes of the square-shaped bar 112 lie along the vertical and horizontal axes of the void 98. Also positioned within the void 98 are a plurality of torsion members 116, depicted in FIG. 6 as 116a, 116b, 116c, and 116d. These members are advantageously constructed from a hard rubber-like material having resiliency associated therewith. It should be appreciated that the suspension unit 90 acts in a combined spring-damper-bearing fashion due to the resiliency of the torsion members 116 when the square-shaped bar 112 is rotated about its longitudinal axis. The ends of the bar 112 extend beyond the outside dimension of the suspension unit holder 90 for purposes described subsequently.

A blade arm 100 (see FIG. 7) is attached to the suspension unit holder 90. As shown in FIG. 8, the blade arm 100 is curvilinear in shape and is constructed of a stainless steel or other metallic material. Although the blade arm 100 is an integral unit, cross-sections thereof show that it may comprise different geometric shapes. For example, FIG. 7A is a cross-section of the blade arm 100 taken along the lines A—A of FIG. 7 and shows that the cross-section is substantially rectangular. FIG. 7B, which is a cross-section taken along the lines B—B of FIG. 7, shows that the cross-section at this location is elliptical in shape. FIG. 7C, which is a cross-section taken along the lines C—C of FIG. 7, shows that the cross-section of the blade arm 100 is substantially an irregular pentagon in shape at this location.

It has been determined that the shape of the blade arm 100 provides significant advantages to the present invention. The shape as depicted in FIG. 7, and the cross-sections relating thereto, allows material which is cleaned from the conveyor belt to flow around the blade arm 100, thereby decreasing the likelihood of undesired build-up of material in the area of the blade arm 100.

Figure 10:
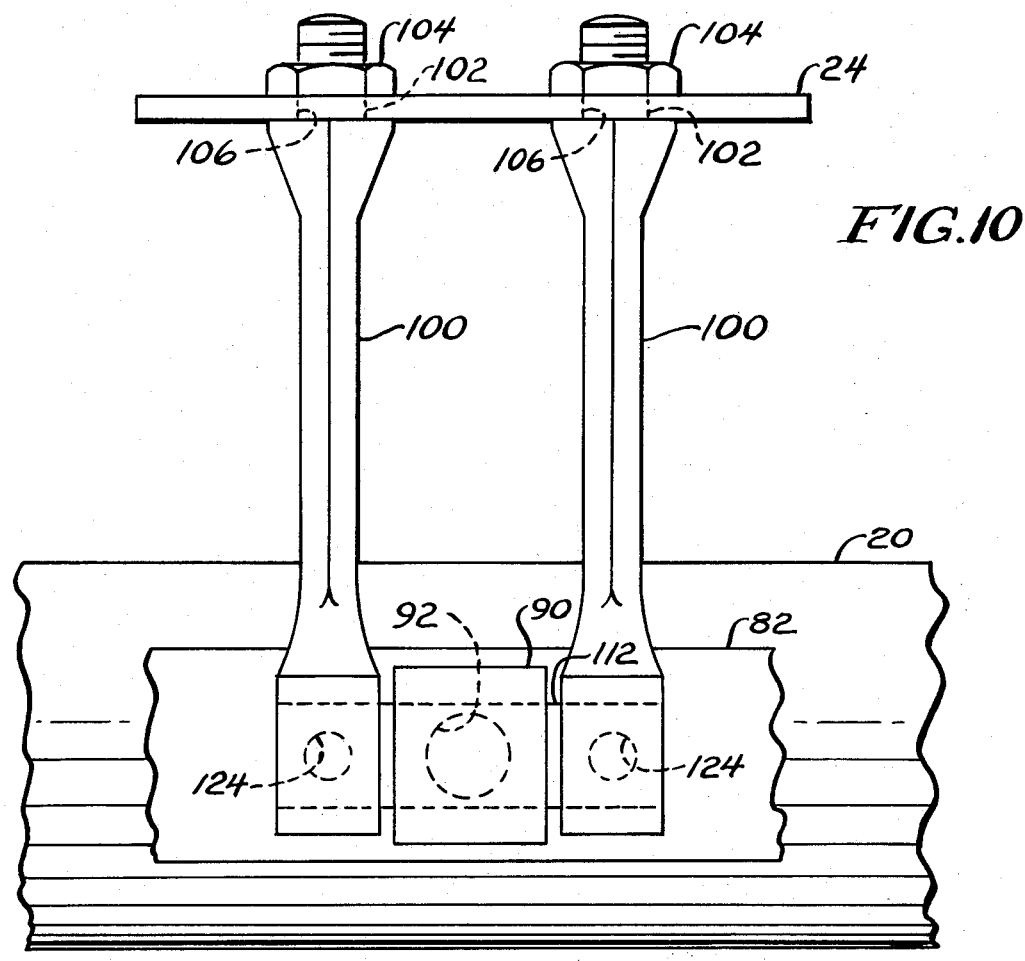
FIG. 10 depicts two blade arms attached to the shaft at one end and at the other end thereof attached to the blade.

The blade arm 100 has attached to it at one end thereof a bolt 102 for receipt of the blade 24 (see FIG. 9). The blade 24 includes a hole 106 adapted to mate with the bolt 102 and a blade tip 108 which may be made from tungsten carbide or a ceramic material heat bonded to blade tip support 110. The blade 24 is attached to the blade arm 100 by a nut, or the like (not shown). Alternatively, the blade 24 can include a plurality of holes 106 as shown in FIG. 10 if it desired to utilize wider blades. In this situation, each of the holes 106 would be positioned on identical blade arms 100. In other words, if the blade was wide enough to require support at two locations, the blade 24 would be attached to two adjacent blade arms 100.

The end of the blade arm 100 opposite the bolt 102 is provided with an attachment member 120. The attachment number 120 includes a void 122 adapted to receive that portion of the bar 112 extending beyond the outside dimension of suspension unit holder 90. The attachment member 120 also includes a threaded screw hole 124 for receipt of a set screw (not shown) used to tighten the member 120 on the bar 112 and firmly hold the blade arm 100 thereon. For example, as shown in FIG. 10, two blade arms 100 are attached to the bar 112 passing through the suspension unit holder 90. At the opposite end thereof, the blade 24, provided with two holes 106, is attached to the blade arms 100 by nuts 104.

As will be appreciated, the number of blades 24 of the cleaning apparatus 18 is a function of the width of the flexible belt 16 to be cleaned and the width of the blades. Through experimentation, it has been determined that blade widths of from about 4 to about 6 inches work particularly well for conveyor belts having flexible belt widths of about 16 to about 120 inches. However, it should be noted that the width of the blades may vary from that given above, it only being necessary to ensure that the blades are not so wide as to give rise to the problems noted in the prior art.

Prior to operation, the cleaning apparatus 18 is adjusted such that the blade tip 108 rides slightly against the belt 16 of the conveyor belt 10, preferably at a location where the belt 16 makes contact with the head pulley 12 or any other pulley or roller associated with the conveyor belt 10, it only being necessary to assure that the blade tip 108 contacts the surface of the belt 16 at a location where the belt 16 is supported by such pulleys, rollers, etc. In addition, for maximum efficiency of cleaning, it is preferred that the blade tip 108 contact the surface of the belt 16 at an obtuse angle, with such angle being measured between a line tangent to the surface of the belt and the blade tip 108. This is accomplished by tightening the set screw 150 passing through hole 78 to cause the U-shaped bracket 34 to be rotated about the longitudinal axis of the square-shaped member 68. In addition, the shaft 20 is rotated about its longitudinal axis until the blade tip 108 is in close proximity to the flexible belt 16. Then, the set screws positioned in the holes 46 are tightened to secure the shaft 20. The set screw 150 passing through the hole 78 is then released so that the U-shaped bracket 34 rotates counterclockwise under influence of the torsion unit 62 until the blade tip 108 makes contact with the flexible belt 16. Proper location of the blade tip 108 for efficient cleaning of the belt 16 is achieved when the blade tip 108 contacts the belt 16 rearward of a line drawn between the center of the head pulley 12 (or other pulleys or rollers) and the center of the square-shaped bar 112.

During operation of the conveyor belt 10, the belt 16 may have a tendency to vibrate across its width, such as due to imperfections in the head pulley 12. Such vibration will cause varying forces to be applied to the blade tips 108. Accordingly, the cleaning apparatus 18 of the present invention allows each blade tip 108 to be independently movable with respect to the remaining blade tips 108. This occurs through rotation of the blade arms 100 about the longitudinal axis of the square-shaped bar 112 positioned within the suspension unit 90 (as depicted with reference to the arc identified by the letter "x" in FIG. 1) and by further rotation of the U-shaped bracket 34 about the longitudinal axis of the square-shaped member 68 positioned within the torsion unit 62 (as depicted with reference to the arc identified by the letter "y" in FIG. 1).

I claim:

1. A self-adjusting cleaning apparatus for use in cleaning the surface of an endless conveyor belt apparatus and the like, comprising:

a blade removably attached to a blade arm, said blade arm adapted, at the end thereof opposite said blade, for attachment to a bar member which is connected to a first torsion unit, said first torsion unit being removably attachable to a shaft, a torsional arm support having means for rotatably supporting each end of said shaft and a tubular member releasably engagable to and translatable along a threaded spindle, said threaded spindle being connected to a spindle support, whereby said blade contacts the surface of said endless belt at a location where said belt is supported by a cylindrical means associated with said endless conveyor belt and said blade is movable in response to force imparted by the endless belt as the belt translates across the end of the blade.

2. A self-adjusting cleaning apparatus for use in cleaning the surface of a pulley associated with an endless conveyor belt apparatus and the like, comprising:
a blade removably attached to a blade arm, said blade arm adapted, at the end thereof opposite said blade, for attachment to a bar member which is connected to a first torsion unit, said first torsion unit being removably attachable to a shaft, a torsional arm support having means for rotatably supporting each end of said shaft and a tubular member releasably engagable to and translatable along a threaded spindle, said threaded spindle being connected to a spindle support, whereby said blade contacts the surface of said pulley and said blade is movable in response to force imparted by the surface of said pulley as the pulley rotates across the end of the blade.

3. The cleaning apparatus of claim 1 or 2, wherein said blade comprises a blade tip support having a blade tip made from an abrasive-resistant hard material attached at one end thereof and the other end thereof being adapted for removable attachment to said blade arm.

4. The cleaning apparatus of claim 1 or 2, wherein said blade arm comprises a rigid curvilinear arm with one end thereof having a void therein for receipt of said bar member and further having a threaded hole communicating with said void for receipt of a set screw in order to engage said arm on said bar member and with the other end thereof being provided with a means for attaching said blade thereto.

5. The cleaning apparatus of claim 1 or 2, wherein said first torsion unit comprises a top portion having a substantially square-shaped cross-sectional first void therein with said bar member passing therethrough and aligned such that the diagonal axes of said bar member are parallel to the horizontal and vertical axes of said void; a resilient member positioned at each corner of said void; a bottom portion having a second void therein and a threaded hole partially therethrough communicating with said second void; and a set screw adapted to be received in said threaded hole.

6. The cleaning apparatus of claim 1 or 2, wherein said shaft includes a reinforcing bar on one surface thereof and a bar on the opposite surface thereof having at least one hole therein, with the longitudinal axis of said hole lying along a radius of said shaft, said hole being fitted with a removable plug such that the uppermost portion of said plug extends beyond the top surface of said bar to provide a means for attaching said first torsion unit to said shaft.

7. The cleaning apparatus of claim 1 or 2, wherein said arm support comprises a U-shaped bracket having a closed end portion and an open end portion defined by arms with a stop means attached to the inner surface thereof opposite the ends of said arms and with a shaft support attached to the outer surface of said U-shaped bracket opposite the ends of said arms, the ends of said arms being provided with a plurality of holes therethrough, said shaft support having a void therethrough for receipt of said shaft and also having at least one threaded hole communicating with said void; a first set screw adapted for receipt in said at least one threaded hole; a housing including said tubular member adapted to receive said threaded spindle, said tubular member being attached on one surface thereof to a plate and on the opposite surface thereof to a set screw holder, said plate being further attached to spaced-apart brackets, a second torsion unit disposed between said spaced-apart brackets, with said second torsion unit provided with a plurality of holes such that said second torsion unit is releasably engaged with the ends of said arms when the holes in the ends of said arms are aligned with the holes of said second torsion unit and attachment means are passed therethrough; a second set screw adapted for receipt in said set screw holder.

8. The cleaning apparatus of claim 1 or 2, wherein said threaded spindle includes a plurality of threaded adjustment lugs.

9. The cleaning apparatus of claim 3, wherein said blade tip is made from tungsten carbide, ceramic material or tool steel having abrasive-resistant properties associated therewith.

10. The cleaning apparatus of claim 1, wherein said cylindrical means comprises a head pulley or a roller associated with said endless conveyor belt apparatus.

11. A self-adjusting cleaning apparatus for use in cleaning the surface of endless conveyor belts and the like, comprising:
a blade including a blade tip support having a blade tip made from an abrasive-resistant hard material attached at one end thereof and the other end thereof being removably attached to one end of a blade arm, said blade arm comprising a rigid curvilinear arm with the other end thereof having a first void therein with a bar member passing therethough and further having a first threaded hole partially therethrough and communicating with said first void, such that with a first set screw positioned in said first threaded hole tightening of said first set screw will hold said blade arm on said bar member;
a first torsion unit connected to said bar member, said first torsion unit comprising a top portion having a substantially square-shaped cross-sectional void therein with said bar member passing therethrough and aligned such that the diagonal axes of said bar member are parallel to the horizontal and vertical axes of said square-shaped void, a resilient member positioned at each corner of said square-shaped void, a bottom portion having a second void therein and a second threaded hole partially therethrough communicating with said second void, and a second set screw positioned in said second threaded hole;
a shaft including a reinforcing bar on one surface thereof and a bar on the opposite surface thereof, said bar having at least one hole therein, with the longitudinal axis of said hole lying along a radius of said shaft, said hole being fitted with a removable plug such that the uppermost portion of said plug extends beyond the top surface of said bar, said plug being adapted for mating engagement in said second void of the bottom portion of said first torsion unit such that with such mating engagement tightening of said second set screw will hold said first torsion unit in contact with said bar;
an arm support attached to each end of said shaft, said arm support comprising a U-shaped bracket having a closed end portion and an open end portion defined by arms, with a stop means attached to the inner surface of said bracket opposite the ends of said arms; a shaft support, with a third void therein adapted to receive the ends of said shaft, attached to the outer surface of said bracket opposite the ends of said arms, said shaft support being provided with at least one third threaded hole communicating with said third void for receipt of a third set screw, the ends of said arms being provided with a plurality of holes; a tubular member attached on one surface thereof to a plate and one the opposite surface thereof to a set screw holder, said plate being further attached to spaced-apart brackets, a second torsion unit disposed between said spaced-apart brackets, a fourth set screw adapted for receipt in said set screw holder;

said second torsion unit comprising a holder having a substantially square-shaped cross-sectional void therein with a central member having a substantially square-shape cross-section positioned in said square-shaped void and aligned such that the diagonal axes of said central member are parallel to the horizontal and vertical axes of said square-shaped void, a resilient member positioned at each corner of said square-shaped void, with said central member being provided with a plurality of holes passing therethrough such that said second torsion unit is releasably engagable with said arms when the holes of said central member are aligned with the holes of said arms and attachment means are passed therethrough;

a threaded spindle passing through said tubular member and having a plurality of threaded adjustment lugs to hold said tubular member in a stationary position;

a spindle support attached to one end of said threaded spindle and adapted to hold said threaded spindle in a stationary position, whereby said blade tip contacts the surface of said endless belt at a location where said belt is supported by a cylindrical means associated with said endless conveyor belt and sale blade tip is movable in response to force imparted by the endless belt as the belt translates across the surface of the blade tip.

* * * * *